United States Patent [19]

Sasaki et al.

[11] Patent Number: 5,124,403
[45] Date of Patent: Jun. 23, 1992

[54] THERMOPLASTIC RESIN COMPOSITION

[75] Inventors: Isao Sasaki, Otake; Kozi Nishida, Toyama; Masaharu Fujimoto, Otake, all of Japan

[73] Assignee: Mitsubishi Rayon Co., Ltd., Tokyo, Japan

[21] Appl. No.: 431,879

[22] Filed: Nov. 6, 1989

[30] Foreign Application Priority Data

Nov. 7, 1988 [JP] Japan .................. 63-279282

[51] Int. Cl.⁵ .............. C08L 69/00; C08L 67/02; C08L 33/12
[52] U.S. Cl. ..................... 525/67; 525/133; 525/148
[58] Field of Search ............ 525/67, 133, 148, 66

[56] References Cited

U.S. PATENT DOCUMENTS 4,254,232  3/1981  Mueller .................. 525/67
4,727,117  2/1988  Hallden-Abberton ........ 525/343

Primary Examiner—John C. Bleutge
Assistant Examiner—David Buttner
Attorney, Agent, or Firm—Oblon, Spivak, McClelland, Maier & Neustadt

[57] ABSTRACT

Disclosed is a thermoplastic resin composition consisting essentially of (1) 1 to 97 parts by weight of a methacrylimide-containing thermoplastic polymer (A) containing at least 10% by weight of methacrylimide units of the general formula

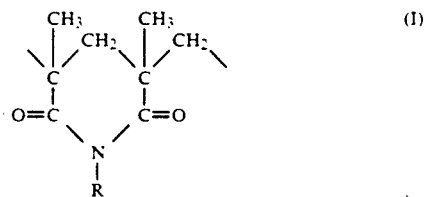

where R is a hydrogen atom or an aliphatic, aromatic or alicyclic hydrocarbon groups of 1 to 20 carbon atoms, the methacrylimide-containing polymer (A) including acid groups and acid anhydride group in an amount of not less than 0.41 milliequivalent per gram of the thermoplastic polymer;

(2) 1 to 97 parts by weight of a thermoplastic polyester (B); and (3) 2 to 98 parts by weight of a polycarbonate resin (C); the combined amount of components (A) to (C) being 100 parts by weight.

4 Claims, No Drawings

THERMOPLASTIC RESIN COMPOSITION

BACKGROUND OF THE INVENTION

1. Field of the Invention

This invention relates to novel thermoplastic resin compositions consisting essentially of a specific methacrylimide-containing polymer, a polyester and a polycarbonate. More particularly, it relates to thermo-plastic resin compositions consisting essentially of the aforesaid three components and having excellent mechanical properties and moldability.

2. Description of the Prior Art

While methacrylimide-containing polymers have a high heat distortion temperature and excellent properties such as stiffness, surface hardness and moldability, they are poor in mechanical strength as typified by impact strength. Thus, as long as methacrylimied-containing polymers are used alone, their use as molding materials is rather limited under the existing circumstances.

Thermoplastic polyesters, as typified by polyethylene terephthalate and polybutylene terephthalate, have excellent mechanical properties, chemical resistance and electrical characteristics and are being used in wide applications including electrical and electronic equipment parts, automobile parts and the like. However, because of their low heat distortion temperatures under high load (as measured according to ASTM D-648 under a load of 18.56 kg/cm$^2$), they cannot be used as structural materials which may be subjected to high loads under high-temperature conditions. Moreover, since they are crystalline polymers and exhibit high molding shrinkage, difficulties are encountered in molding them.

Polycarbonate resins are excellent in mechanical properties as represented by thermal resistance and impact resistance, but poor in surface hardness and solvent resistance. Thus, their use is considerably limited in the existing circumstances.

The present inventors have made an intensive study with a view to improving the mechanical properties of methacrylimide-containing polymers, the heat distortion temperature under high load and molding shrinkage of thermoplastic polyesters, and the surface hardness and solvent resistance of polycarbonate resins. As a result, it has been discovered that the combination a specific methacrylimide-containing polymer, a thermoplastic polyester and a polycarbonate resin provides resin compositions exhibiting good compatibility and having excellent mechanical properties, thermal resistance, surface hardness, solvent resistance and moldability. The present invention has been completed on the basis of this discovery.

SUMMARY OF THE INVENTION

It is an object of the present invention to provide a resin composition exhibiting good compatibility and having excellent mechanical properties, thermal resistance, surface hardness, solvent resistance and moldability.

According to the present invention, there is provided a thermoplastic resin composition consisting essentially of (1) 1 to 97 parts by weight of a methacrylimide-containing thermoplastic polymer (A) containing at least 10% by weight of methacrylimide units of the general formula

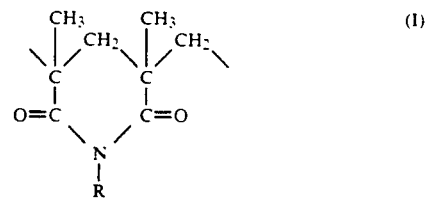

where R is a hydrogen atom or an aliphatic, aromatic or alicyclic hydrocarbon groups of 1 to 20 carbon atoms, the methacrylimide-containing polymer (A) including acid groups and acid anhydride groups in an amount of not less than 0.41 milliequivalent per gram of the thermoplastic polymer;

(2) 1 to 97 parts by weight of a thermoplastic polyester (B); and (3) 2 to 98 parts by weight of a polycarbonate resin (C); the combined amount of components (A) to (C) being 100 parts by weight.

DETAILED DESCRIPTION OF THE PREFERRED EMBODIMENTS

The methacrylimide-containing polymer (A) used in the present invention is a polymer or copolymer containing cyclic imide units represented by the above general formula (I).

Methacrylimide-containing polymers having any desired chemical structure can be used, provided that they contain not less than 10% by weight of cyclic imide units as described above. However, methacrylimide-containing polymers in which R is hydrogen atom, methyl, ethyl, propyl, butyl or phenyl group are usually used.

No particular limitation is placed on the method of preparing the methacrylimide-containing polymers. By way of example, one useful process comprises dissolving polymethyl methacrylate and ammonia or a primary amine (such as methylamine or ethylamine) in a suitable solvent (selected, for example, from aromatic hydrocarbons such as benzene, toluene, xylene and ethylbenzene; alcohols such as methanol, ethanol and propanol; and mixtures of two or more, such solvents), and heating the reaction mixture in an autoclave at 170°-350° C. to form imide rings. Alternatively, the reaction may be carried out in an extruder as described in Japanese Patent Laid-Open No. 63989/'77.

It is necessary that the cyclic imide units represented by the above general formula (1) be contained in an amount of not less than 10% by weight based on total weight of the polymer. If the amount is less than 10% by weight, the methacrylimide-containing polymer will fail to exhibit its inherent thermal resistance.

It is well known that, where methacrylimide-containing polymers are prepared according to the above-described processes, imidization reaction intermediates such as methacrylic acid groups and acid anhdyride groups are formed as by-products in the resulting polymer (see, for example, Japanese Patent Laid-Open No. 89705/'87). The amount of such by-products can be controlled by varying the reaction conditions (such as reaction temperature). Preferably, this can also be accomplished by using a methyl methacrylate-methacrylic acid copolymer, in addition to the polymethyl methacrylate used as one of the starting materials.

In order to obtain the resin compositions of the present invention, the methacrylimide-containing polymer needs to include the aforesaid by-products (i.e., acid groups and acid anhydride groups) in an amount of not less than 0.41 milliequivalent per gram. If the amount of acid groups and acid anhydride groups is less than 0.41 milliequivalent per gram, the compatibility of the components will become poor and the desired moldability-improving effect cannot be distinctly achieved, though the reason for this has not be clearly understood.

The content of acid groups and acid anhydride groups should preferably be not greater than 1.2 milliequivalents per gram. If the content is greater than 1.2 milliequivalents per gram, the resulting resin composition may tend to show a reduction in water resistance.

The thermoplastic polyester (B) used in the present invention is a polyester obtained by the polycondensation of at least one aromatic dicarboxylic acid component selected from the group consisting of terephthalic acid, 2,6-naphthalenedicarboxylic acid and isophthalic acid, with at least one diol component selected from the group consisting of ethylene glycol, propylene glycol, butylene glycol, hexylene glycol and polyalkylene glycols such as poleythylene glycol and polytetramethylene glycol. Specific examples thereof include polyethylene terephthalate (PET), polypropylene terephthalate (PPT), polybutylene terephthalate (PBT), polyhexylene terephthalate (PHT), polyethylene naphthalate (PEN) and polybutylene naphthalate (PBN), as well as copolyesters such as polyethylene terephthalate isophthalate (PET/I) and polybutylene terephthalate isophthalate (PBT/I).

These polyesters can further contain 30 mole % or less of other copolymerizable components such as adipic acid, sebacic acid, dodecanedioic acid, hexadecanedicarboxylic acid, octadecanedicarboxylic acid, dimer acids, phthalic acid, 4,4'-diphenyldicarboxylic acid, sulfoisophthalic acid, and the addition product of ethylene oxide to bisphenol A. The thermoplastic polyester (B) used in the present invention may comprise a mixture of two of more of the above-described thermoplastic polyesters.

The polycarbonate resin (C) used in the present invention can be a polycarbonate obtained by the reaction of phosgene with bisphenol A or by the ester exchange reaction of bisphenol A with a carbonic diester.

The resin compositions of the present invention consist essentially of 1 to 97 parts by weight of the specific methacrylimide-containing polymer (A), 1 to 97 parts by weight of the thermoplastic polyester (B), and 2 to 98 parts by weight of the polycarbonate resin (C), the combined amount of components (A) to (C) being 100 parts by weight. However, in order that the thermal resistance of the methacrylimide-containing polymer, the mechanical properties of the thermoplastic polyester, and the mechanical properties (such as impact resistance) of the polycarbonate resin may not be impaired, it is preferable to use the methacrylimide-containing polymer (A) in an amount of 20 to 80 parts by weight, the thermoplastic polyester (B) in an amount of 10 to 80 parts by weight, and the polycarbonate resin in an amount of 10 to 70 parts by weight, provided that the combined amount of components (A) to (C) is 100 parts by weight.

The methacrylimide-containing polymer (A), the thermoplastic polyester (B) and the polycarbonate resin (C) can be compounded, for example, by providing the components in the form of granules, powders or chips, melt-blending them in a V-type blender, a supermixer or a kneader, and reducing the resulting blend into chips for use in subsequent molding.

The resin compositions of the present invention, which are obtained by combining the above-illustrated methacrylimide-containing polymers, thermoplastic polyesters and polycarbonate resins, have excellent mechanical properties, thermal resistance, surface hardness, solvent resistance and moldability.

In order to improve their thermal resistance, light resistance and resistance to oxidative degradation, thermal decomposition inhibitors and ultraviolet light absorbers may be added to the resin compositions of the present invention. Moreover, plasticizers, pigments, lubricants and the like may also be used therein. Furthermore, fibrous materials such as glass fibers and carbon fibers may also be added thereto for reinforcing purposes.

The mechanical properties, as represented by impact strength, of the resin compositions of the present invention can further be improved by adding thereto one or more impact modifiers in an amount of up to about 40% by weight based on the total weight of the resin composition. For this purpose, there can be used impact-resistant resins such as acrylonitrile-butadiene-styrene terpolymers (ABS resins), methyl methacrylate-butadiene-styrene terpolymers (MBS resins), ethylene/propylene/diene terpolymer rubbers (EPDM rubbers) acrylonitrile-styrene graft polymers (AES resins); and various rubber-like polymers including, for example, thermoplastic elastomers such as ethylene-based ionomer resins, modified polyethylene containing glycidyl ester groups, polyether esters, polyether ester amides and polyetheramides. Moreover, a minor amount (i.e., up to about 20% by weight based on the total weight of the resin composition) of other polymer or polymers may be incorporated in the resin compositions of the present invention for the purpose of rendering various properties thereof more desirable. Polymers useful for this purpose include, for example, styrene-acrylonitrile copolymers (AS resins), styrene-methyl methacrylate-acrylonitrile copolymers and α-methylstyrenestyrene-acrylonitrile copolymers.

The resin compositions of the present invention can be used in powder, chip or other suitable form to make various useful molded articles according to generally known plastics molding techniques such as press molding, injection molding, blow molding and extrusion molding.

The present invention is more specifically explained with reference to the following examples.

In these examples, all parts and percentages are by weight. Heat distortion temperatures were measured according to ASTM D 648-56 (under a load of 18.56 kg/cm$^2$), and Izod impact strengths were measured according to ASTM D 256-56, Method A. The molding shrinkages of the resulting compositions were measured according to ASTM D-955, and the surface hardnesses of the resulting compositions were expressed by Rockwell hardness numbers (M scale) measured according to ASTM D-785.

Determination of the degree of imidization (%) of a methacrylimide-containing polymer (A)

The nitrogen content of the polymer (A) was determined by elemental analysis using an MT-3 CHN Recorder (manufactured by Yanagimoto seisakusho). Moreover, using a JNM-FX-100 Spectrometer (manufactured by JEOL), a proton NMR spectrum thereof was recorded at a frequency of 100 MHz. It was assumed that the methacrylimide-containing polymer (A) had a repeated structure composed of methacrylimide ring units and methyl methacrylate units as represented by the general formula

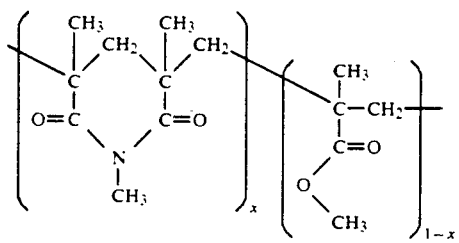

On this assumption, the value or x was determined and converted to a percentage, which was regarded as its degree of imidization. The value of x was determined from the nitrogen content obtained by elemental analysis and from the integral ratio of the methyl absorption of $>N-CH_3$ the methyl absorption of $-O-CH_3$ in the proton NMR spectrum.

Determination of the content of acid groups and acid anhydride groups in a methacrylimide-containing polymer (A)

A sample of the polymer (A) was weighed and dissolved in 50 ml of dimethylformamide. This solution was subjected to a conductometric titration in which a 0.1N solution of potassium hydroxide in methanol was added thereto, with stirring, until the end point was reached. Thus, the content of acid group and acid anhydride group was determined in milliequivalents.

Determination of the intrinsic viscosity of a methacrylimide-containing polymer (A)

Using a Deereax-Bischoff viscometer, the flowing time ($t_s$) of a 0.5 wt % solution of the polymer (A) in chloroform and the flowing time ($t_o$) of chloroform were measured at $25° \pm 1°$ C. After the relative viscosity, $\eta_{rel}$, of the polymer (A) was obtained from the value of $t_s/t_o$, the intrinsic viscosity thereof was calculated according to the following equation:

$$\text{Intrinsic viscosity} = \lim_{c \to 0} (\ln \eta_{rel}/C)$$

where C is the concentration (in g/100 ml) of the polymer (A)

SYNTHESIS EXAMPLE 1

A 10-liter reactor fitted with a paddle spiral agitator, a pressure gauge, a sample pouring vessel and a jacket heater was charged with 100 parts of a methyl methacrylate polymer (PMMA) having an intrinsic viscosity of 0.51, 90 parts of toluene, and 10 parts of methanol. This mixture was heated to 200° C. and stirred until the polymer was completely dissolved. After the addition of 21.7 parts of methylamine (in a molar ratio of 0.7 based on the methyl methacrylate units in PMMA), the resulting mixture was heated under an internal pressure of 60 kg/cm²G for 3 hours. After completion of the reaction, a methacrylimide-containing polymer (A-1) was recovered and dried. The powder thus obtained was used as a sample.

SYNTHESIS EXAMPLE 2

A methacrylimide-containing polymer (A-2) was obtained in the same manner as described in Synthesis Example 1, except that the methyl methacrylate polymer was replaced by a copolymer composed of methyl methacrylate and methacrylic acid (NMA-MAA copolymer) in a ratio of 90:10 and having an intrinsic viscosity of 0.60.

SYNTHESIS EXAMPLE 3

A methacrylimide-containing polymer (A-3) was obtained in the same manner as described in Synthesis Example 1, except that the methylamine was replaced by 12 parts of ammonia (in a molar ratio of 0.7 based on the methyl methacrylate units in PMMA).

SYNTHESIS EXAMPLE 4

A methacrylimide-containing polymer (A-4) was obtained in the same manner as described in Synthesis Example 2, except that the methylamine was replaced by 12 parts of ammonia (in a molar ratio of 0.7 based on the methyl methacrylate units and methacrylic acid units in the copolymer).

SYNTHESIS EXAMPLE 5

The methacrylimide-containing polymer (A-1) obtained in Synthesis Example 1 was dissolved in tetrahydrofuran. Diazomethane gas was blown through the solution to convert the acid radicals and acid anhydride radicals to methyl ester. Thus, there was obtained a methacrylimide-containing polymer (A-5).

The results of evaluation of the methacrylimide-containing polymers (A-1 to A-5) obtained in Synthesis Examples 1 to 5 are given in Table 1.

TABLE 1

| Synthesis Example No. | Designation of polymer formed | Starting material for imidization reaction | Degree of imidization (%) | Content of acid groups and acid anhydride group (milliequivalents per gram) | Heat distortion temperature (°C.) |
|---|---|---|---|---|---|
| Synthesis Example 1 | A-1 | MMA polymer | 70 | 0.45 | 150 |
| Synthesis Example 2 | A-2 | MMA-MAA copolymer | 75 | 0.50 | 155 |
| Synthesis Example 3 | A-3 | MMA polymer | 65 | 0.50 | 190 |
| Synthesis Example 4 | A-4 | MMA-MAA copolymer | 70 | 0.60 | 197 |
| Synthesis Example 5 | A-5 | MMA polymer | 70 | 0.10 | 147 |

EXAMPLES 1-6 AND COMPARATIVE EXAMPLES 1-7

The various methacrylimide-containing polymers (A-1 to A-5) prepared in the foregoing Synthesis Examples 1 to 5, a polybutylene terephthalate (PBT) commercially available from Mitsubishi Rayon Co., Ltd. under the trade name of Toughpet PBT N1000) and a polycarbonate (PC) (commercially available from General Electric Co. under the trade name of Lexan 141) were mixed in the blending ratios shown in Table 2. Each of the resulting resin compositions was melt-blended at 280° C. by means of an extruder having a cylinder diameter of 40 mm, and then injection-molded at a cylinder temperature of 280° C. and a mold temperature of 80° C. to prepare various types of specimens.

These specimens were used to evaluate some properties of the resin compositions, and the results thus obtained are given in Table 2. In addition, the methacrylimide-containing polymers (A-1 to A-5), the polybutylene terephthalate and the polycarbonate were each molded under the same conditions and their properties were evaluated. The results of evaluation are also given in Table 2.

It is evident from a comparison with the Comparative Examples that the resin compositions of the present invention exhibited a well-balanced combination of thermal resistance, mechanical properties, moldability and surface characteristics. Moreover, it is also evident that the resin composition (Comparative Example 7) using the methacrylimide-containing polymer (A-5) obtained in Synthesis Example 5 was inferior in all of the tested properties to the resin composition of Example 1.

TABLE 2

|  | Blending ratio (parts) | | | Physical properties of composition | | | |
|---|---|---|---|---|---|---|---|
|  | (A) Methacrylimide-containing polymer | (B) PBT | (C) PC | Heat distortion temperature [°C.] | Izod impact strength [kg · cm/cm$^2$] | Molding shrinkage [%] | Surface hardness [M scale] |
| Example 1 | A-1, 80 | 10 | 10 | 138 | 9 | 0.25 | 105 |
| Example 2 | A-1, 50 | 25 | 25 | 122 | 11 | 0.3 | 100 |
| Example 3 | A-1, 20 | 30 | 50 | 114 | 15 | 0.4 | 95 |
| Example 4 | A-2, 50 | 25 | 25 | 124 | 10 | 0.3 | 102 |
| Example 5 | A-3, 50 | 25 | 25 | 138 | 10 | 0.3 | 105 |
| Example 6 | A-4, 50 | 25 | 25 | 141 | 10 | 0.3 | 106 |
| Comparative Example 1 | A-1, 100 | — | — | 150 | 1.0 | 0.2 | 110 |
| Comparative Example 2 | A-2, 100 | — | — | 155 | 0.9 | 0.2 | 111 |
| Comparative Example 3 | A-3, 100 | — | — | 190 | 0.8 | 0.2 | 111 |
| Comparative Example 4 | A-4, 100 | — | — | 197 | 0.7 | 0.2 | 112 |
| Comparative Example 5 | — | 100 | — | 65 | 3.5 | 1.8 | 86 |
| Comparative Example 6 | — | — | 100 | 135 | >90 | 0.6 | 70 |
| Comparative Example 7 | A-5, 80 | 10 | 10 | 130 | 4 | 0.5 | 95 |

EXAMPLES 7-12 AND COMPARATIVE EXAMPLE 8

The various methacrylimide-containing polymers (A-1 to A-4) prepared in Synthesis Examples 1 to 4, a polyethylene terephthalate (PET) (commercially available from Mitsubishi Rayon Co., Ltd. under the trade name of Dianite MA500) and a polycarbonate (commercially available from General Electric Co. under the trade name of Lexan 141) were mixed in the compounding ratios shown in Table 3. Some properties of the resulting resin compositions were evaluated in the same manner as in Example 1, and the results thus obtained are given in Table 3. The results of evaluation of the polyethylene terephthalate alone (Comparative Example 8) are also given in Table 3.

As is evident from Table 3, the resin compositions of the present invention exhibited a well-balanced combination of thermal resistance, mechanical properties, moldability and surface characteristics.

TABLE 3

|  | Blending ratio (parts) | | | Physical properties of composition | | | |
|---|---|---|---|---|---|---|---|
|  | (A) Methacrylimide-containing polymer | (B) PBT | (C) PC | Heat distortion temperature [°C.] | Izod impact strength [kg · cm/cm$^2$] | Molding shrinkage [%] | Surface hardness [M scale] |
| Example 7 | A-1, 80 | 10 | 10 | 139 | 7 | 0.4 | 107 |
| Example 8 | A-1, 50 | 25 | 25 | 123 | 10 | 0.45 | 102 |
| Example 9 | A-1, 20 | 30 | 50 | 115 | 12 | 0.5 | 100 |
| Example 10 | A-2, 50 | 25 | 25 | 125 | 7 | 0.45 | 102 |
| Example 11 | A-3, 50 | 25 | 25 | 139 | 7 | 0.45 | 103 |
| Example 12 | A-4, 50 | 25 | 25 | 141 | 7 | 0.45 | 103 |
| Comparative Example 8 | — | 100 | — | 67 | 3 | 2.0 | 108 |

EXAMPLES 13-18

In these examples, an impact modifier component (D) was used in addition to the methacrylimide-containing polymer (A), the thermoplastic polyester (B) and the polycarbonate resin (C). For this purpose, one of the following polymers (D-1 and D-2) was used as component (D).

D-1: A graft copolymer obtained by polymerizing 30 parts of styrene and 10 parts of acrylonitrile in the presence of 60 parts of polybutadiene rubber.

D-2: An ethylene/glycidyl methacrylate copolymer containing 10% by weight of glycidyl methacrylate units.

These four components were mixed in the compounding ratios shown in Table 4. Each of the resulting resin compositions was melt-blended and molded in the same manner as in Example 1. Then, some properties of these resin compositions were evaluated and the results thus obtained are given in Table 4.

It can be seen that, when an impact modifier component was added, there were obtained resin compositions having a more excellent combination of properties.

TABLE 4

| | Blending ratio (parts) | | | | Physical properties of composition | | | |
|---|---|---|---|---|---|---|---|---|
| | (A) Methacrylimide-containing polymer | (B) PBT | (C) PC | (D) | Heat distortion temperature [°C] | Izod impact strength [kg · cm/cm²] | Molding shrinkage [%] | Surface hardness [M scale] |
| Example 13 | A-1, 70 | 10 | 10 | D-1, 10 | 135 | 18 | 0.2 | 106 |
| Example 14 | A-1, 70 | 10 | 10 | D-2, 10 | 137 | 17 | 0.2 | 107 |
| Example 15 | A-1, 50 | 15 | 15 | D-1, 20 | 120 | 25 | 0.2 | 103 |
| Example 16 | A-1, 50 | 15 | 15 | D-2, 20 | 119 | 24 | 0.2 | 102 |
| Example 17 | A-3, 50 | 15 | 15 | D-1, 20 | 139 | 17 | 0.2 | 110 |
| Example 18 | A-3, 50 | 15 | 15 | D-2, 20 | 138 | 15 | 0.2 | 109 |

What is claimed is:

1. A thermoplastic resin composition consisting essentially of (1) 1 to 97 parts by weight of a methacrylimide-containing thermoplastic polymer (A) containing at least 10% by weight of methacrylimide units of the general formula

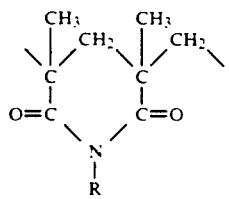

where R is a hydrogen atom or an aliphatic, aromatic or alicyclic hydrocarbon groups of 1 to 20 carbon atoms, the methacrylimide-containing polymer (A) including acid groups and acid anhydride groups in an amount of not less than 0.41 milliequivalent per gram of the thermoplastic polymer;

(2) 1 to 97 parts by weight of a thermoplastic polyester (B) which is a polyester obtained by the polycondensation of at least one aromatic dicarboxylic acid component selected from the group consisting of terephthalic acid, 2,6-naphthalene-dicarboxylic acid and isophthalic acid, with at least one diol component selected from the group consisting of ethylene glycol, propylene glycol, butylene glycol, hexylene glycol and polyalkylene glycols; and (3) 2 to 98 parts by weight of a polycarbonate resin (C) which is obtained by the reaction of phosgene with bisphenol A or by the ester exchange reaction of bisphenol A with a carbonic diester;

the combined amount of components (A) to (C) being 100 parts by weight.

2. The thermoplastic resin composition of claim 1 wherein the content of acid groups and acid anhydride group in the methacrylimide-containing polymer (A) is in the range of 0.41 to 1.2 milliequivalents per gram.

3. The thermoplastic resin composition of claim 1 or 2 which consists essentially of 20 to 80 parts by weight of the methacrylimide-containing polymer (A), 10 to 80 parts by weight of the thermoplastic polyester (B) and 10 to 70 parts by weight of the polycarbonate resin (C), the combined amount of components (A) to (C) being 100 parts by weight.

4. The thermoplastic resin composition of claim 1 or 2 which additionally contains one or more impact modifiers selected from the group consisting of acrylonitrile-butadiene-styrene terpolymers, methyl methacrylate-butadiene-styrene terpolymers, ethylene/propylene/diene terpolymer rubbers-acrylonitrile-styrene graft polymers, ethylene-based ionomer resins, modified polyethylene containing glycidyl ester groups, polyether esters, polyether ester amides and polyetheramides, in an amount of not greater than 40% by weight based on the total weight of the thermoplastic resin composition.

* * * * *